United States Patent [19]
Kennedy

[11] 3,916,484
[45] Nov. 4, 1975

[54] METHOD AND APPARATUS FOR AUTOMATIC CARCASS CUTTING

[76] Inventor: Raymond A. Kennedy, 3518 Stone Park Blvd., Sioux City, Iowa 51104

[22] Filed: Oct. 5, 1973

[21] Appl. No.: 403,821

[52] U.S. Cl............................................ 17/52; 17/23
[51] Int. Cl.² ............................................. A22C 17/00
[58] Field of Search ........................ 17/52, 23, 24, 1

[56] References Cited
UNITED STATES PATENTS

| | | | |
|---|---|---|---|
| 2,551,155 | 5/1951 | Orling | 17/24 |
| 3,234,591 | 2/1966 | Vogt et al. | 17/52 |
| 3,800,363 | 4/1974 | Lapeyre | 17/52 |

*Primary Examiner*—Robert Peshock
*Attorney, Agent, or Firm*—Gardiner, Sixbey, Bradford & Carlson

[57] ABSTRACT

The method and apparatus for automatic carcass cutting involves marking the cut position and angle of cut for various primary cuts of meat to be taken from a carcass and subsequently controlling the cutting of the carcass in response to such markings. The markings on the carcass are manually provided by cut specialists who mark the carcass cuts in distinctive colors. The colored markings are subsequently sensed by a video camera which scans the entire carcass and feeds a memory bank which then provides instructions for automatically accomplishing the proper cut as the carcass reaches sequential cutting stations along a line of travel. The carcass hangs vertically from an overhead conveyor and moves horizontally while prime cuts are sequentially made from the bottom to the top of the carcass.

20 Claims, 10 Drawing Figures

METHOD AND APPARATUS FOR AUTOMATIC CARCASS CUTTING

BACKGROUND OF THE INVENTION

In a conventional packing house operation, animals are slaughtered, their hides are removed, and the resultant dressed carcass is hung in a storage cooler for subsequent cutting. During the cutting operation, the carcass is manually segmented by skilled cut specialists into a series of primary cuts which are then further cut and trimmed. This primary cut operation is not only time consuming, but requires that a number of highly skilled cut specialists be employed to manually segment each carcass. On any particular day, the manner in which the primary cuts are made will vary depending upon the selling price that day for each primary cut. For example, the price of a loin or shoulder cut might vary from 2 to 8 cents per pound per day, and when the price for a loin cut is high, the primary cut will be positioned to maximize the weight of the loin. On the other hand, when the price of a shoulder cut is high, the cut is positioned to maximize the shoulder section weight.

Not only does the primary cutting operation for a carcass require highly skilled cut specialists, but also this cutting operation consistently causes a backup in packing house operations. During a single slaughtering shift, a larger number of animals can be slaughtered and prepared for cutting than can be cut during a cut shift of equal length. It often requires one and a half cutting shifts to segment into the primary cuts the animals previously slaughtered and prepared during a single slaughtering shift. Therefore, scheduling of packing house operations becomes a problem.

Some attempts have been made to rectify the time lag incurred in separating a carcass into prime cuts. Several operator controlled cutting systems have been developed wherein knives and other cutting implements mechanically controlled by an operator sever prime cuts from a carcass as it moves along a conveyor belt. U.S. Pat. Nos. 3,177,520; 3,234,590; and 3,234,591 to Vogt are typical of systems of this type.

Although controlled cutting systems of the type illustrated by the aforementioned patents have, to some extent, decreased the total man-hours by skilled cut specialists required to accomplish primary cutting of a carcass, such systems have sacrificed to some extent the extreme accuracy achieved by the manual cut. For example, an operator manually controlling an automated cutting blade is, by necessity, positioned at some distance from the carcass to be cut as the carcass moves between various cutting stations. Often, a difference of only one-fourth of an inch in the position of cut will have an appreciable effect upon the total profit realized from the various primary cuts accomplished during a full cutting work shift. It is impossible for an operator spaced any appreciable distance from the carcass to manually control cutting machinery in a manner which will insure that cuts can be made to one-fourth of an inch accuracy. Also, previously known cutting systems have required that special conveyors be provided for transporting a carcass between cutting stations, and the conventional overhead conveyors by which a carcass is normally hung in a packing house may not be used.

In technologies other than meat cutting, television camera tubes have been employed to optically scan moving units and to store in memory units specific physical characteristics of such units derived from the optical scanning procedure. Subsequently, the information stored in memory may be employed to control automated machinery capable of performing some function upon the unit previously scanned. The veneer clipper control system of U.S. Pat. No. 3,560,096 to Watson et al. is typical of the use of this video scanning technique in other technologies. It is a primary object of the present invention to provide a novel and improved method and apparatus for automated carcass cutting which adapts such video scanning and memory storage techniques to an automated carcass cutting operation.

Another object of the present invention is to provide a novel and improved method and apparatus for automated carcass cutting which will provide a cut accuracy approximating that of a manual skilled cut specialist while enabling a carcass to be separated into primary cuts at high speed.

A further object of the present invention is to provide a novel and improved method and apparatus for automated carcass cutting wherein primary cuts are outlined by a single skilled cut specialist and subsequent cutting operations in the manner outlined are accurately made by a completely automated apparatus.

Another object of the present invention is to provide a novel and improved method and apparatus for automated carcass cutting wherein automated separation of a carcass into primary cuts is accomplished while the carcass is traveling suspended from a conventional overhead carcass conveyor system.

A further object of the present invention is to provide a novel and improved method and apparatus for automated carcass cutting wherein automated cutting equipment is controlled by a video scanning and memory system capable of storing primary cut information for several hundred carcasses.

A still further object of the present invention is to provide a novel and improved apparatus for automated carcass cutting wherein various cutting knives of different types in a plurality of cutting stations are controlled by a single video scanning and memory system capable of storing information regarding primary cuts to be made on several hundred carcasses, and the control at each cutting station is achieved in response to distinctive color markings for each cut previously applied to a carcass.

These and other objects of the present invention will be readily apparent upon a consideration of the following specification and claims taken in conjuntion with the accompanying drawings in which:

Figure 1:
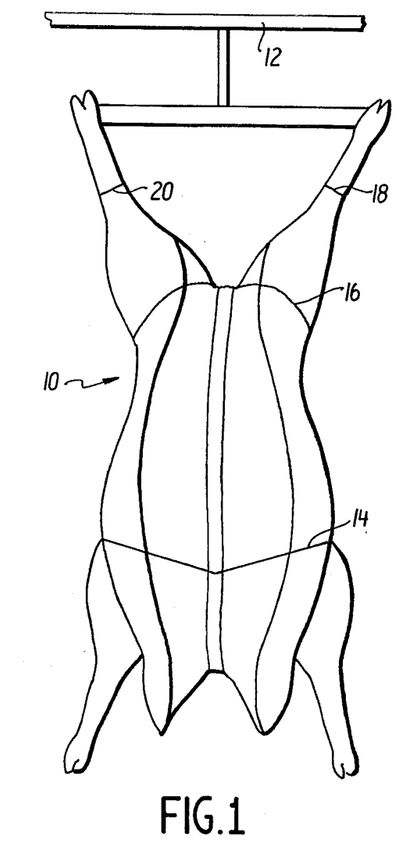
FIG. 1 is a view in side elevation of a carcass suspended from an overhead conveyor and marked in accordance with the method of the present invention.

In a modern packing house operation, once an animal has been slaughtered and the hide removed, the carcass may be hung in a storage cooler and subsequently conveyed by means of an overhead conveyor to cutting stations or, the carcass may be directly conveyed to suitable cutting stations. In accordance with the method of the present invention, the hung carcass 10 of FIG. 1 mounted on an overhead conveyer 12 is marked by a skilled cut specialist either in the cooler or at a pre-cut point on the conveyor. This marking includes a first angular mark 14 to designate the front shoulder cut for the carcass, a second angular mark 16 to designate the loin cut for the carcass, and additional marks 18 and 20 to designate the ham cuts for the carcass. These marks for the various cuts designate both the cut direction and the angle of cut, and the markings are made in colors which radiate particular frequencies when scanned by a light sensitive scanner. For example, the line or marking 14 might be black, the line or marking 16 might be blue, and the lines or markings 18 and 20 might be green. These markings are made to provide maximum yield for the more expensive primary cuts in accordance with daily price indices.

Figure 2:
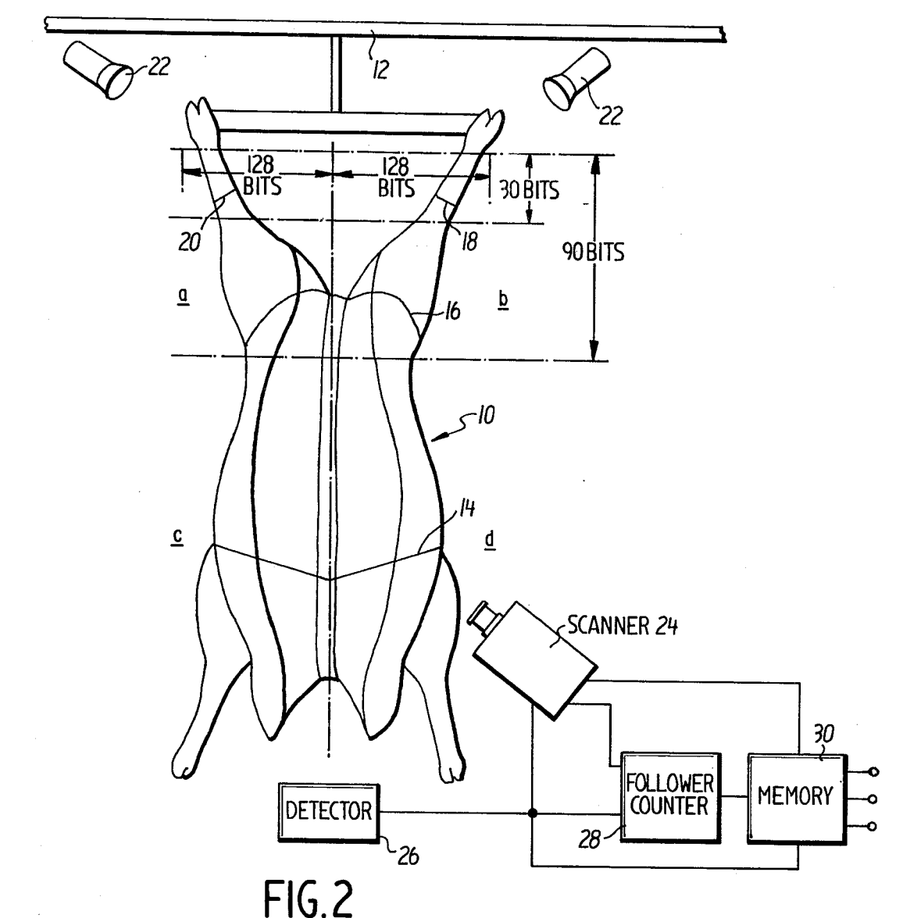
FIG. 2 is a block diagram of the scanning station for the automated carcass cutting apparatus of the present invention.

Each marked carcass is conveyed along the conveyor 12 to a first scanning station shown in FIG. 2. This station is well illuminated by lighting units 22 so that the carcass may be scanned by a video scanning camera 24. A detector 26 senses when the carcass 10 is in the proper position for scanning and triggers both the video scanning camera 24, a follower counter 28 and a memory 30. The carcass is moved along the overhead conveyor at a controlled rate which is coordinated with the scan of the scanning camera 24 in known manner, and the scanning camera is positioned to rapidly scan the complete carcass. The scanning camera is filtered by a red filter so that the red meat, white fat and bone appear the same. However, the markings on the carcass radiate different frequencies and are therefore sensed by the camera.

The vertical retrace pulse of the scanning camera 24 will reset to zero the follower counter 28, which constitutes a vertical scan follower counter, insuring that the starting point of the scan will always be the same. Each horizontal scan retrace pulse of the scanning camera will advance the follower counter one count. The video output from the scanning camera will have an automatic threshold that does not pass a normal video output, but only permits passage of the high contrast frequency signals from the lines 14, 16, 18 and 20 which will show up in the video output from the scanning camera as pulses. The leading edges of such pulses will transfer the count on the vertical scan follower counter 28 to the memory 30 where digital signals indicative of each of the lines 14, 16, 18 and 20 will be stored for further use.

The scanning camera 24 is relatively spaced from the carcass 10 so that the complete vertical expanse of the carcass including the various lines 14, 16, 18 and 20 can be rapidly scanned by the camera. Also, the scan generator for the scanning camera may be controlled from a tachometer device responsive to the speed of the conveyor 12 whereby the movement of the carcass 10 does not appreciably affect the output from the scanning camera 24. Other known devices for compensating this scanning camera to eliminate the effects of movement caused by the conveyor 12 may be employed, and several such devices are known to the art.

Figure 3:
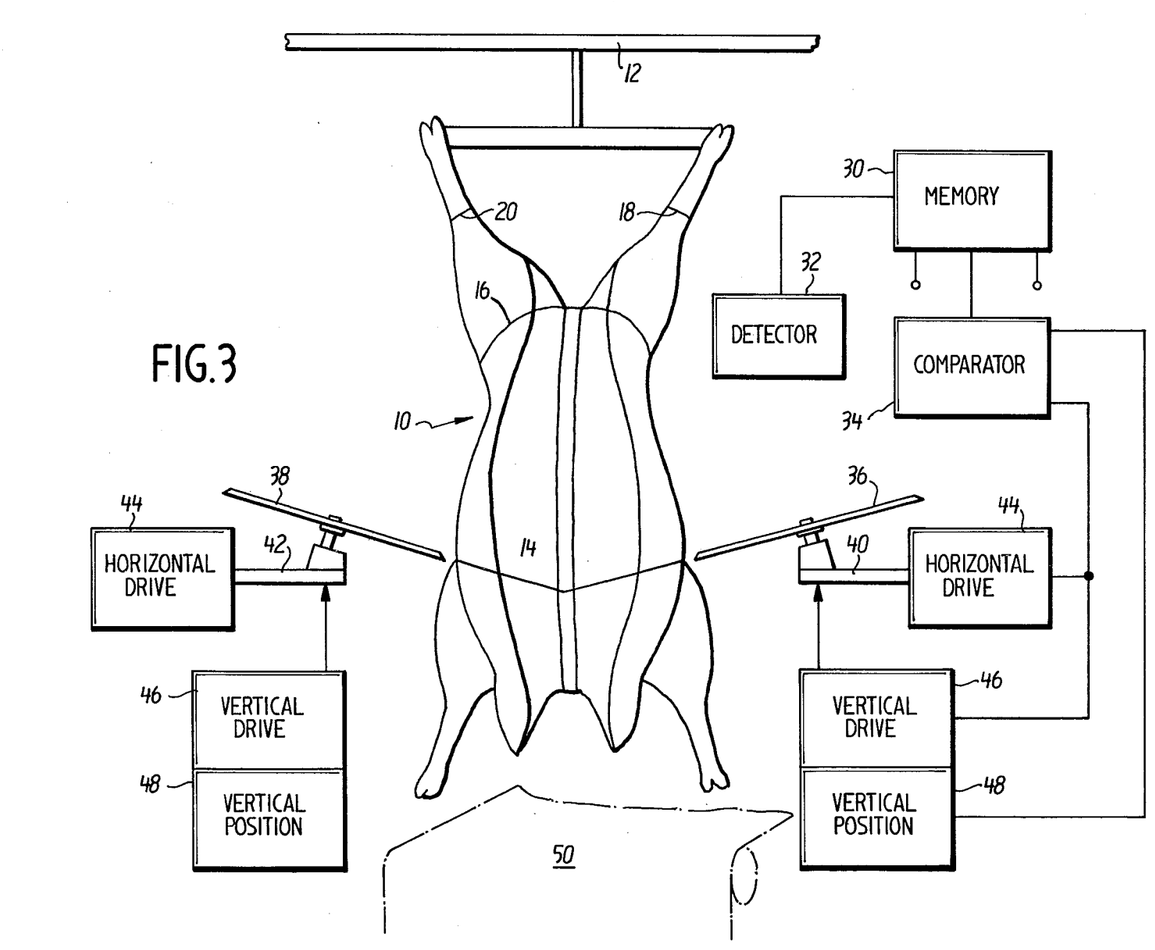
FIG. 3 is a block diagram of the shoulder cutting station for the automated carcass cutting apparatus of the present invention.

From the scanning station of FIG. 2, the carcass 10 on the conveyor 12 moves to the first cutting station illustrated in FIG. 3 where a front shoulder cut is made along the line 14. When the carcass 10 is in position for the shoulder cut, a detector 32 triggers the memory 30 to permit the digitized representation of the marking 14 previously fed into the memory from the scanning camera to be read out into a comparator 34.

The shoulder cut along the line 14 may be made by two motor driven knives 36 and 38 which are mounted upon platforms 40 and 42 respectively. Each platform includes a horizontal drive unit 44 for driving the platform and the rotating knife mounted thereon horizontally toward and away from the carcass 10. Additionally, each platform is provided with a vertical drive unit 46 for raising and lowering the platform and the rotating cutting knife mounted thereon and a vertical position indicator 48 for providing an output indicative of the vertical position of the associated platform. Each vertical position indicator is connected to the comparator 34 and the output from this indicator is compared in the comparator with the output signal from the memory 30. Thus, in the comparator 34, the desired vertical position of the platforms 40 and 42 stored in the memory 30 is compared with the actual positions of these platforms received by the comparator from the vertical position indicator 48. Should the position signals in the comparator be identical, no comparator output to the vertical drive units 46 for the platforms 40 and 42 is provided, but instead, the comparator will trigger the horizontal drive unit 44 to cause the rotating knives 36 and 38 to make the shoulder cut in the carcass 10. However, if the comparator 34 senses a difference in the signals from the memory 30 and the vertical position indicators 48, the comparator will cause an output signal to be provided to the vertical drive units 46 so that the platforms 40 and 42 will be driven until the outputs from the vertical position indicators 48 indicate the desired output corresponding to the signal from the memory 30. At this point, the comparator will provide a signal to initiate operation of the horizontal drive units 44.

The components constituting the vertical drive units, the vertical position indicators, the horizontal drive units, and the comparator 34 may constitute a number of known components such as servo systems or other positioning system adapted to adjust the position of an element from a first position to a desired position indicated by a control signal. For example, the drive units can be platform screw drive units or hydraulic drive units.

The shoulder cut along the line 14 made by the cutting knives 36 and 38 causes the lower section of the carcass 10 to drop upon a conveyor 50 which then conveys the shoulder cut to a desired despository. The conveyor 50 may be moving in any direction with respect to the direction of movement of the overhead conveyor 12, and in fact may be moving in a direction opposite to the direction of movement to the overhead conveyor.

Figure 4:
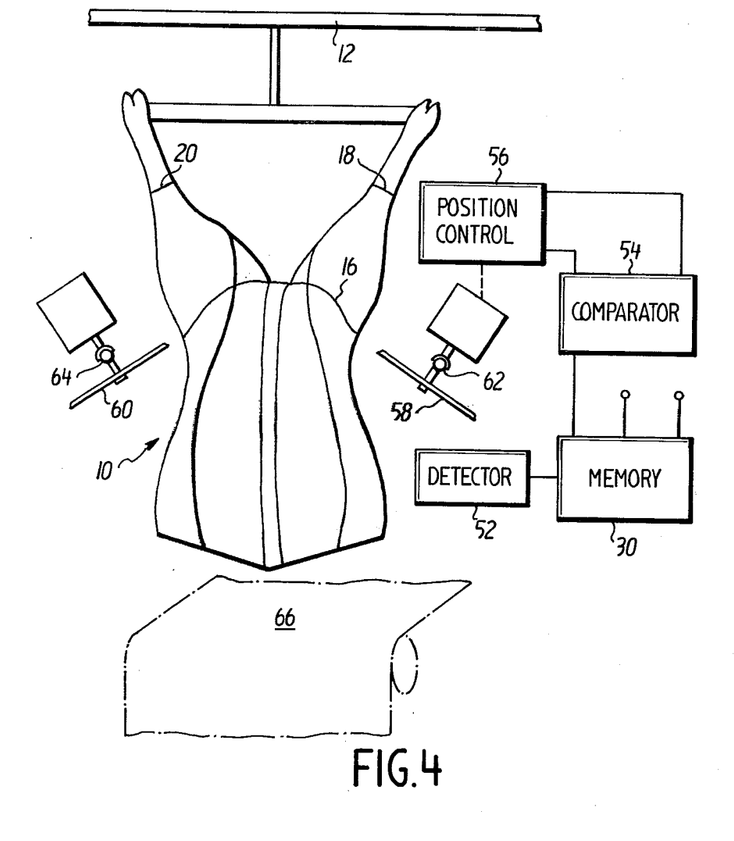
FIG. 4 is a block diagram of the loin cutting station for the automated carcass cutting apparatus of the present invention.

From the shoulder cut station of FIG. 3, the remainder of the carcass 10 moves along the conveyor 12 to a loin cut station illustrated in FIG. 4. Once the carcass reaches the loin cut station, a detector 52 again triggers the memory 30 so that stored information indicative of the position of the mark 16 is outputted by the memory to a comparator 54. The comparator 54 is connected to position control circuits 56 for rotating knives 58 and 60, the position control circuitry being identical to the horizontal drive 44, the vertical drive 46, and the vertical position indicator 48 of FIG. 3. Thus the comparator 54 and position control circuitry 56 operate in the same manner previously described for the comparator 34, horizontal drive 44, the vertical drive 46 and the vertical position indicator 48 of FIG. 3, with the exception that the position control circuitry 56 operates continuously as the cutters 48 and 60 move along the line 16. Thus, instead of making a straight line cut of the type made by the cutters 36 and 38, the cutters 58 and 60 may be adjusted while cutting is in progress to follow a crooked line 16. This is accomplished by mounting the cutters on ball and socket assemblies 62 and 64 so that as the position control circuitry 56 moves the cutters vertically during the cutting, the cutters are caused to pivot at 62 and 64 and thereby change the angle of cut. Once the cut is complete at the loin cut station, the loin portion of the carcass 10 drops upon a conveyor 66 which moves the loin cut to a desired receiving station. Again, this conveyor, like the conveyor 50, can be moving in any direction with respect to the overhead conveyor 12. This feature applies to all cut receiving conveyors employed with this invention.

Figure 5:
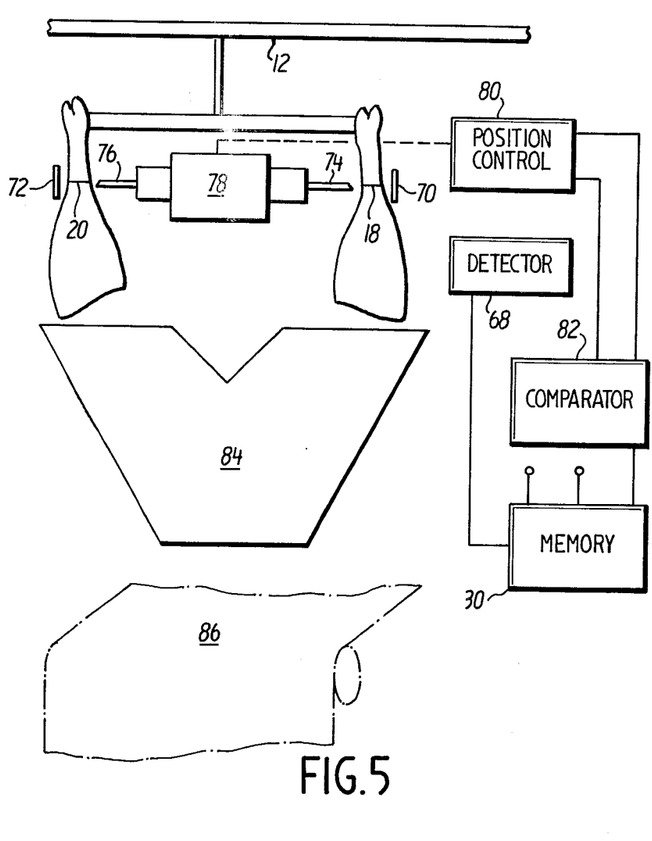
FIG. 5 is a block diagram of the ham cutting station for the automated carcass cutting apparatus of the present invention.

Subsequent to the removal of the loin from the carcass 10 at the loin cut station of FIG. 4, the remaining feet and ham cuts of the carcass proceed along the conveyor 12 to a ham cut station of FIG. 5. At this ham cut station, a detector 68 senses when the remainder of the carcass 10 is positioned between stationary guides 70 and 72 and the blades 74 and 76 of a cleaver type knife. The knife is driven by a driving mechanism 78 which drives the blades 74 and 76 outwardly toward the stationary guides 70 and 72 to separate the ham cuts from the feet of the carcass 10 at the lines 18 and 20. The cleaver type knife blades are adjusted vertically by a position control mechanism 80 which is substantially identical to the position control mechanism of FIG. 3 and contains the horizontal drive 44, vertical drive 46, and vertical position indicator 48 of FIG. 3. A comparator 82 is connected to receive the stored indication of the desired vertical position of the knives 74 and 76 from the memory 30 and to compare this desired position indication with the actual position indication provided by the position control 80. The comparator outut is then employed to vertically position the knives 74 and 76 opposite the lines 18 and 20 in the manner previously described.

When the cleaver type blades 74 and 76 sever the carcass along the lines 18 and 20, the ham cuts drop into a chute 84 which deposits these cuts on a conveyor 86. The conveyor then conveys the ham cuts to a proper receptacle or station where further trimming may occur.

Figure 6:
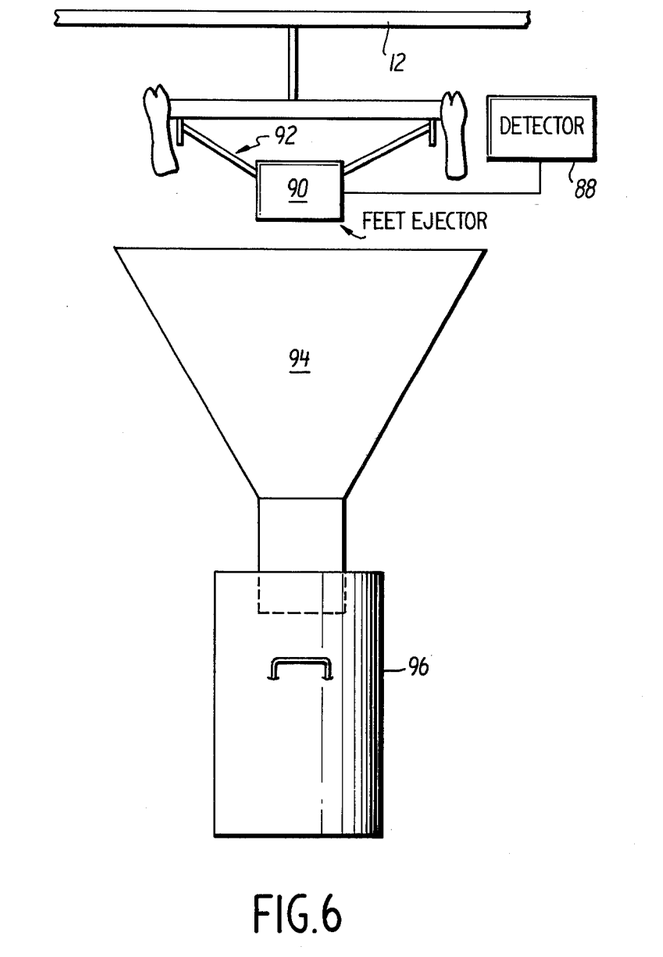
FIG. 6 is a block diagram of the feet ejector for the automated carcass cutting apparatus of the present invention.

From the ham cut station of FIG. 5, the feet portions of the carcass 10 are now conveyed past a detector 88 in FIG. 6 which senses the presence of such feet portions and triggers an ejection solenoid 90 for a feet ejector assembly 92. The ejector assembly then detaches the feet from the conveyor 12 and causes them to drop into a chute 94 leading to a container 96. The ejector assembly 92 may constitute any mechanical assembly suitable for ejecting the feet of the carcass 10 from the conveyor 12 upon receipt of a signal from the detector 88.

A review of the operation depicted in FIGS. 1–6 will indicate that the carcass 10 moves smoothly from the initial marking operation to the final foot ejection step of FIG. 6. Primary cuts are sequentially accomplished on the carcass as it hangs vertically from a conventional overhead conveyor 12 and moves horizontally past spaced cutting stations. The primary cuts progress vertically up the carcass, so that once a cut is accomplished, the severed section drops by gravity onto a receiving means spaced beneath the carcass. Thus cut sections of the same type are automatically separated from other cuts, and may be independently conveyed to trimming or storage stations removed from the main conveyor 12.

Figure 7:
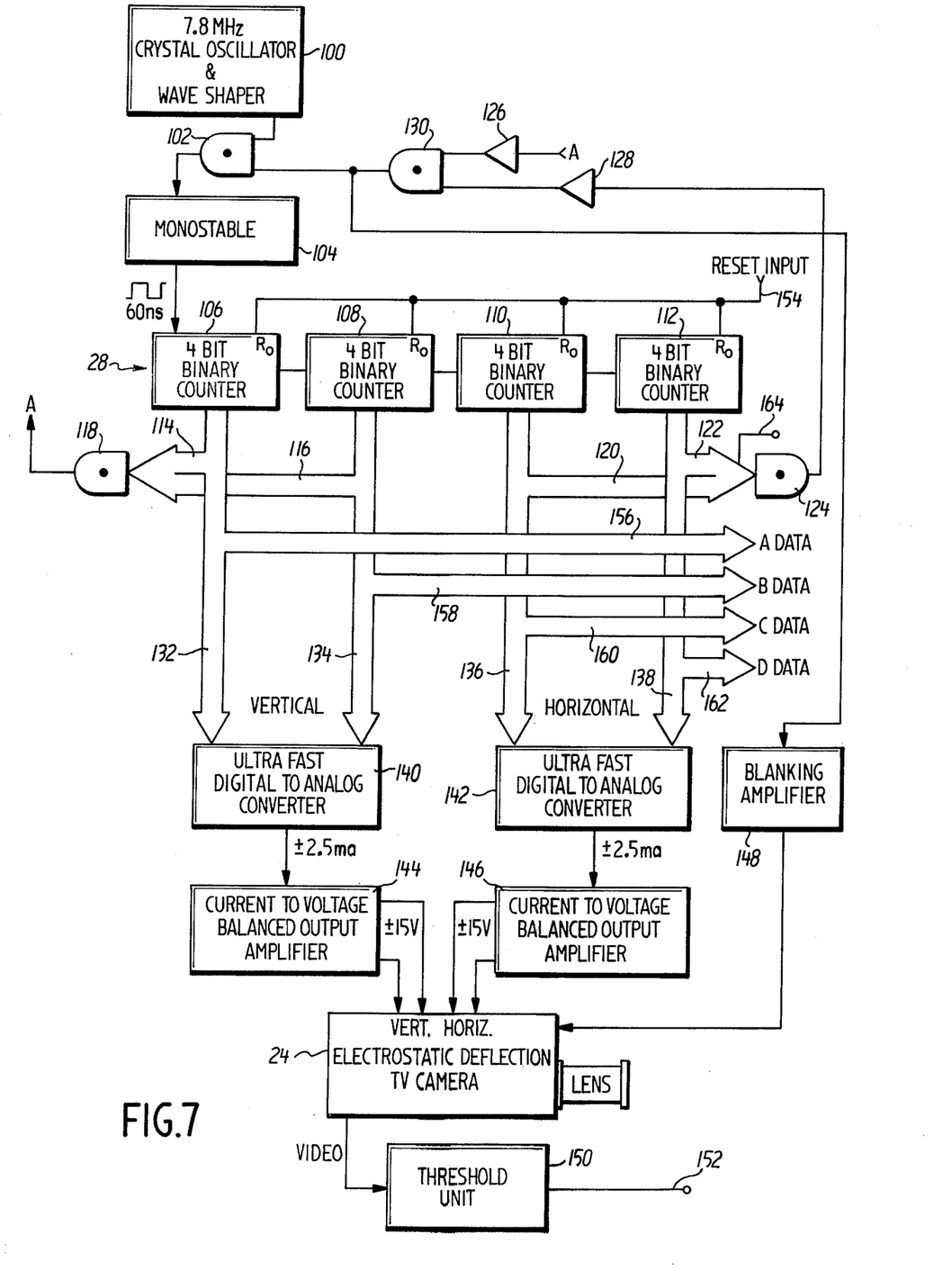
FIG. 7 is a block diagram of the vidicon camera and control circuit therefor used with the present invention.

FIGS. 7–10 disclose electrical control circuitry for the video scanning camera 24 and circuitry for the memory 30. Referring to FIG. 7, a time base unit 100, which may include a crystal oscillator and wave shaper, provides output clock pulses (7.8 megahertz) to one input of a gate 102. When the gate 102 is activated to pass the clock pulses, the output from the gate feeds pulses to a monostable multivibrator 104 which maintains time continuity by conditioning the time base signal so that the subsequent video display cannot be started by one half a clock pulse. The monostable multivibrator provides a rectangular output waveform (which may have a 65 nanosecond to 63 nanosecond mark to space ratio), and this output waveform enters a first four bit synchronous binary counter 106 of the follower counter 26. The follower counter includes four cascaded four bit synchronous binary counters 106, 108, 110 and 112. The Q outputs 114 and 116 of the counters 106 and 108 respectively are fed to an eight input Nand gate 118 while the Q outputs 120 and 122 of the counters 110 and 112 respectively are fed to the inputs of an eight input Nand gate 124. The outputs of the Nand gates 118 and 124 are inverted by inverters 126 and 128 respectively and these inverted outputs form the inputs to a Nand gate 130. The output of the Nand gate 130 provides the second input to the gate 102 and operates to close the gate 102 when the outputs of the counters 106, 108, 110 and 112 are all at a logic one level.

Output data from the counters 106, 108, 110 and 112 is fed by means of outputs 132, 134, 136 and 138 to two ultrafast digital to analog converters 140 and 142. These digital to analog converters have offset binary inputs, and the counters 106 and 108 feed the digital to analog converter 140 while the counters 110 and 112 feed the digital to analog converter 142. Each digital to analog converter provides ± 2.5 milliamp output to one of two current to voltage converters 144 and 146. The current to voltage converter 144 converts the output from the digital to analog converter 140 into two balanced push pull ± 15 volt outputs while the current to voltage converter 146 converts the output from the digital to analog converter 142 into two ± 15 volt balanced push pull outputs. The outputs from the current to voltage converter 144 represent vertical sweep voltages while those from the current to voltage converter 146 represent horizontal sweep voltages to drive the deflection plates in an electrostatic deflection image Videcon picture camera tube of the video scanning camera 24.

It will be noted that the output of the gate 130 is connected through a blanking amplifier 148 to the video scanning camera 24. This output from the blanking amplifier operates in known manner to cut off the electron beam in the image Videcon tube during quiescent times to enhance the life of the tube. This leaves the electron beam on only during a scanning frame.

The output from the video scanning camera 24 is connected to A threshold unit 150 which provides a video output at 152 having an automatic threshold level which will permit only high contrast frequency signals to appear in the video output. Thus, when the video camera scans a cut mark on the carcass 10, a video pulse signal will appear on the output 152 at the point of scan where the cut mark is encountered.

The counters 106, 108, 110 and 112 have a reset input 154 which receives a trigger pulse from a detector 26 (FIG. 2) to initiate the scanning sequence when the carcass 10 is in line with the video camera 24. Also, the outputs 132, 134, 136 and 138 provide A data, B data, C data, and D data respectively on outputs 156, 158, 160, and 162 from the counters.

When the carcass 10 moves into scanning position as illustrated in FIG 2, cut position data will be presented to the scanning camera 24 as the normal frame would see it. The frame is made up of 256 vertical lines of 256 bits per line, and the vertical line sweeps from the top of the carcass to the bottom while the horizontal sweep is from left to right. In order to categorize the cut locations, the camera frame must be considered in sections as illustrated in FIG. 2. First, the carcass is split vertically for scanning purposes into a left section and a right section of 128 bits each. The carcass is also split by a horizontal split of 90 vertical bits from the top of the frame, so that for scanning purposes, the left foot and ham cuts appear in upper left hand section $a$, the right foot and ham cuts appear in upper right hand section $b$, the left shoulder cuts appear in lower left section $c$, and the right shoulder cuts appear in lower right section $d$. Additionally, sections $a$ and $b$ are further split by a horizontal scanning line 30 vertical bits below the top of the frame to incorporate the foot cuts.

Figure 8:
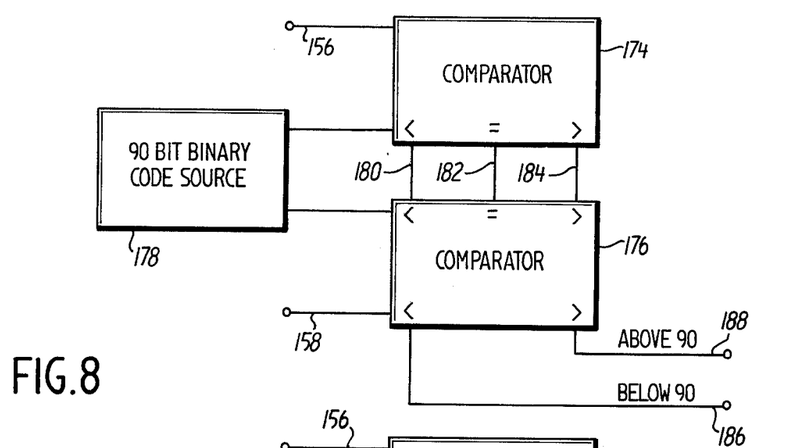
FIG. 8 is a block diagram of the carcass section scan control circuit of the present invention.
Figure 9:
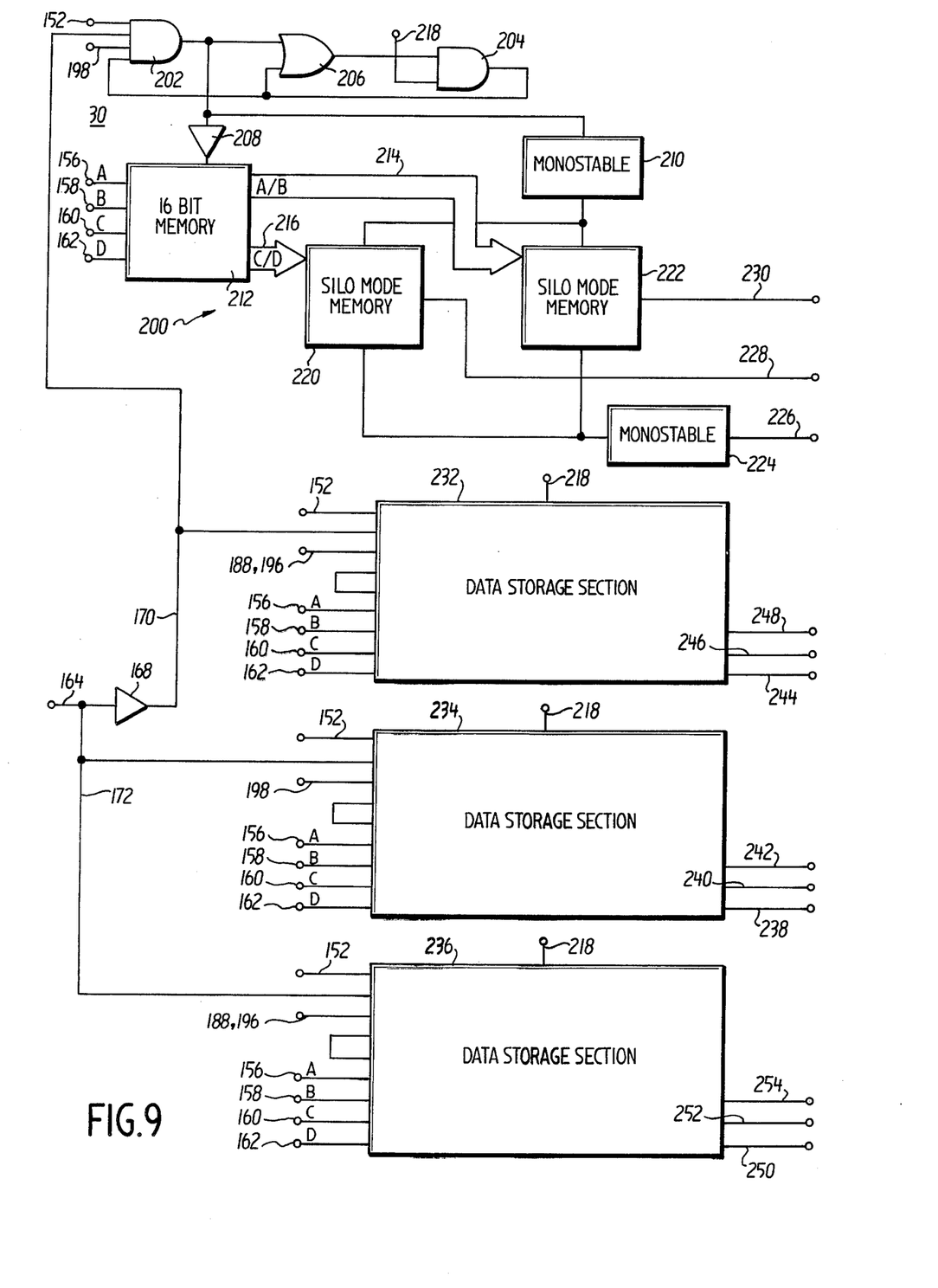
FIG. 9 is a block diagram of the memory circuit of the present invention.
Figure 10:
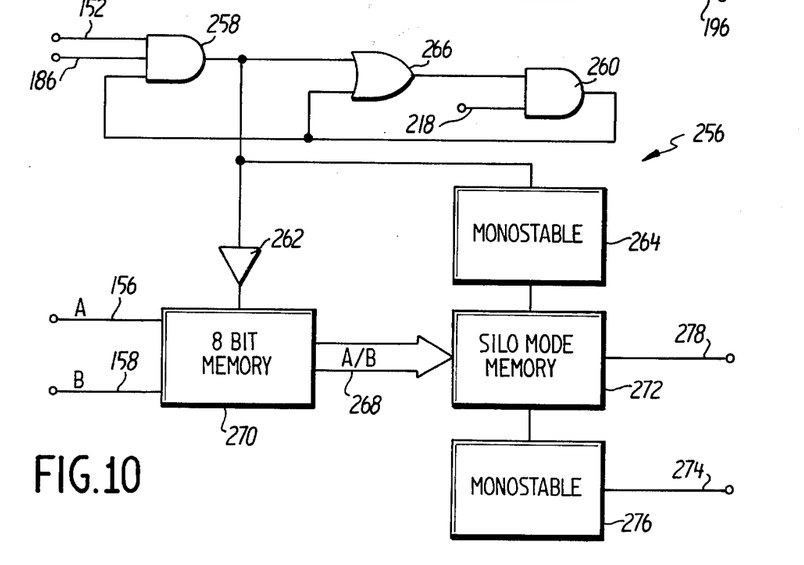
FIG. 10 is a block diagram of a knife position control circuit of the present invention.

The electrical circuitry for providing the scanning divisions of the carcass 10 illustrated in FIG. 2 is shown in FIGS. 8 and 9. The division of the right and left sides of the carcass is generated by the last or Q 4 output from the 4 bit binary counter 112 (FIG. 7) which not only is connected to the input of the gate 124, but is also directly connected to a line 164. This line 164 provides the counter Q 4 output to an inverter 168 (FIG. 9). The counter Q 4 output on the line 164 will be low (logic 0) for all counts below a binary number 128 and will be high (logic 1) for all counts between 128 and 256. Thus, the output from the inverter 164 on a line 168 will be high (logic 1) for all counts between 0 and 128 and will indicate the left side of the carcass 10, while the signal on the line 164 at the input to inverter and thus on a line 172 will be high (logic 1) for all counts between 128 and 256 and therefore will indicate the right side of the carcass. In this manner, the signal on line 164 divides the carcass at the 128 bit point of the horizontal scan.

The major division between the top and the bottom of the carcass 10 is taken 90 vertical bits from the top of the frame for even between the longest and the shortest carass, the change in the ham cut location from a fixed elevation deviates very little. The elevation of the shoulder cut may, on the other hand, vary vertically over a wide range, so the shoulder cuts occupy an area of 166 vertical bits. To accomplish this split, the A and B data outputs 156 and 158 are compared in comparators 174 and 176 to a fixed binary code representing the binary number 90 generated by a code source 178. The comparator outputs (less than, equal to, greater than) 180, 182 and 184 respectively are coupled to the carry inputs (less than, equal to, greater than) of comparator 176. Thus, an output 186 of the comparator 176 will be high (logic 1) during the lower portion of the frame to indicate a position below the 90 bit line while an output 188 of the comparator 176 will be high (logic 1) during the upper portion of the frame to indicate a position above the 90 bit line.

A similar comparison of the A and B output data takes place in comparators 190 and 192, but in this case, the comparison is made with a binary code representing the binary number 30 from a code source 194. The comparators 190 and 192 operate in a manner identical to that of the comparators 174 and 176, so that an output 196 from the comparator 192 is high (logic 1) to indicate a lower frame section below the 30 vertical bit line while an output on line 198 from the comparator 192 is high (logic 1) to indicate a frame section above the 30 vertical bit line.

FIG. 9 illustrates the manner in which scan data from the video scanning camera 24 is stored in the memory 30. This storage is accomplished in sequence as the vertical scan sweeps from the top of the carcass 10 to the bottom. A data storage section 200 is the first to receive the video output on the line 152 from the threshold unit 150 (FIG. 7). This video signal is passed through a Nand gate 202 when the signal on the line 170 from the inverter 168 and the signal on the line 198 are high (logic 1). The signal on the line 170 indicates the left side of the carcass and the signal on the line 198 indicates a position above the 30 bit scan line, and these signals together with the output of a Nand gate 204 constitute the control inputs to gate 202. At the instant the video signal on the line 152 goes high in response to the scanning of a cut mark by the video scanning camera 24, the output of the gate 202 goes low (logic 0). This output is connected to the inputs of a gate 206, an inverter 208, and a monostable multivibrator unit 210. A low input signal at the input of the inverter 208 causes the output of the inverter to go high (logic 1) and this signal is provided to a 16 bit buffer memory 212. The inputs to the memory 212 constitute the A, B, C, and D data on the outputs 156, 158, 160 and 162 from the counters 106, 108, 110, 112 of FIG. 7. The high input clock from the inverter 208 to the memory 212 enables the memory outputs to assume an identity with the memory inputs. Thus memory outputs 214 carry A and B data while memory outputs 216 carry C and D data.

The low signal output at th output of the gate 202 caused by the high video input signal thereto provides an input to the gate 206 which causes the output from this gate to go high. A reset line 218 connected to the input of the gate 204 is also high due to the reset signal provided by the detector 26 (FIG. 2) so that both inputs to the gate 204 are high and the output thereof is low. Since the low output from the gate 204 also provides an input to the gate 206, this low locks the gates 204 and 206 and disables the gate 202, now causing the output of this gate to change state and go high. The high at the output of the gate 202 causes the output of the inverter 208 to go low, and the low input signal to the memory 212 isolates the outputs of the memory from its inputs. Also, the transition of the output signal from the gate 202 from low to high triggers the monostable multivibrator 210, causing the output from the monostable multivibrator to go high. This monostable multivibrator output forces the load controls of two silo mode memories 220 and 222 to go high for 2 nanseconds. Thus, data on the lines 214 and 216 enters the silo mode memories where it is stored for use in controlling the position of the knife 76 in FIG. 5.

Whenever a previous cut is completed, a monostable multivibrator 224 is triggered by an end of cut signal provided thereto on an input line 226. This end of cut signal may be generated from any suitable source, such as a sensor positioned adjacent the knife 76, or a sensor which responds when the ham portion falls away from the feet portion of the carcass to indicate that the cut is complete. The reception of the end of cut signal by the monostable multivibrator 224 triggers the monostable causing its output to go high for 2 nanoseconds. This high output is applied to the silo memories 220 and 222 causing the cut position data stored therein for the next carcass to appear on memory outputs 228 and 230. Since the silo memories might constitute 32 word 8 bit silo mode memories, the output on the line 230 is an 8 word indicative of cut elevation while the output on the line 228 is an 8 bit word indicating cut windage or inclination. These position signals are compared with actual cutter position signals in the comparators previously described.

The data storage section 200 controls the operation of the knife 76 (FIG. 5) for the left foot cut on the carcass 10. Similar data storage sections identical in configuration and operation control the right foot cut, the left ham cut, and the right ham cut. These data storage sections are indicated at 232, 234, and 236. Briefly, to accomplish storage of the right foot cut information in the data storage section 234, the video signal 152, the logic 1 signal on the line 172, and the logic 1 signal indicating a position above the 30 bit line on the input line 198 are inputed to the data storage section 234. An end cut signal on the line 238 causes output information to the outputed from the silo mode memories of this data storage section on the output lines 240 and 242.

To store ham cut information for the left ham cut in the data storage section 232, a video input is provided on the line 152, the left side data signal is provided on the line 170, and the above bit line 90 and below bit line 30 signals from the outputs 188 and 196 respectively are also provided as inputs to the data storage section 232. With all of these inputs at logic 1, the video signal on the line 152 is passed into the data storage section. An end of cut signal on a line 244 causes new output data to be provided from the data storage section 232 on output lines 246 and 248.

Finally, the right ham cut position data is stored in the data storage section 236 in response to the right side signal input on the line 172. Additionally, the above 90 bit line output and the below bit line 30 output from the outputs 188 and 196 respectively are also inputed to the data storage section 236 to cause video data on the line 152 to pass into storage. Upon receipt of an end of cut signal on a line 250, stored data is provided on output lines 252 and 254 of the data storage section 236.

A single data storage section 256 (FIG. 10) is employed to control the position of the knives 36 and 38 of FIG. 3 which perform the shoulder cuts. Since the knives 36 and 38 are adjusted only in vertical direction, the same memory information may be fed to both knives and there is no need to provide left side and right side data storage sections. Instead, a gate 258 receives as inputs the output from a gate 260, the video signal on the line 152, and the below 90 bit line signal from the comparator output 186 (FIG. 8). With all inputs to the gate 258 at a logic 1 level, the output of the gate goes low and is applied to the input of an inverter 262, a monostable multivibrator 264, and a gate 266. The output of the inverter 262 goes high enabling the A, B data outputs 268 of an 8 bit memory 270 to assume an identity equal to the A and B data on the inputs to this memory. The low output signal at the output of the gate 258 causes the output of the gate 266 to go high, and this high output coupled with the high (logic 1) signal on the reset line 218 causes the output of the gate 260 to go low. The low output from the gate 260 is fed to the input of the gate 266 locking up the two gates 266 and 260. The low output from the gate 260 also causes the gate 258 to change state so that the output goes high and the output of the inverter 262 now goes low isolating the inputs and the outputs of the memory 270. At the same time, the new high output from the gate 258 causes the monostable multivibrator 264 to change state so that the output thereof goes high for 2 nanoseconds. This 2 nanosecond pulse is applied to the load control input of a silo memory 272 to enable the silo memory to receive and store data present on the output 268 from the 8 bit memory 270. A cut complete signal on a line 274 to a monostable multivibrator 276 causes this multivibrator to change state and provide a high output signal for 2 nonoseconds to the dump control of the silo memory 272. This causes the silo memory to provide an elevation control word from storage on an output 278 so that the cutters 36 and 38 (FIG. 3) can be positioned for the next cut.

Position data from the various silo memories of the data storage sections can be fed to 8 bit magnitude comparators that are affiliated with particular position functions for the cutters disclosed in FIGS. 3–6. A mechanical to electrical feedback may be accomplished with an absolute shaft position encoder that is coupled to cutter positioning equipment so that binary data output therefrom is directly proportional to cutter movement. The actual cutter position is compared by the various comparators to data from the respective data storage sections. If the data content from the encoder is higher, the comparator will provide an output which causes the cutter positioning equipment to drive the cutter downwardly until the data inputs are equal. The inverse is of course true for inputs of opposite difference magnitudes.

The cutters controlled by data storage sections 200, 232, 234 and 236 may all be similar to the cutters 58 and 60 of FIG. 4, since these data storage sections provide both elevation and inclination control. If inclination control is not needed, only the elevation control output of the data storage section is connected for cutter control.

It will be apparent from a consideration of the preceding specification that the present invention provides a novel method and apparatus for automated carcass cutting which adapts video scanning and memory storage techniques to an automated carcass cutting operation.

What is claimed is:

1. A method for cutting animal carcasses which includes applying cut indicator designations directly to a carcass, moving said carcass suspended vertically from the upper end thereof past a plurality of spaced cutting stations and cutting said vertically suspended carcass at each said cutting station in accordance with said cut indicator designations by making spaced sequential cuts in said vertically suspended carcass at each said cutting station, said cuts beginning at the bottom end of the carcass and working upwardly.

2. The method of claim 1 which includes making transverse cuts in said vertically suspended carcass to cause cut sections thereof to drop away from the remainder of the suspended carcass by gravity.

3. The method of claim 1 which includes moving said vertically suspended carcass to a sensing station positioned before said cutting stations, sensing said cut indicator designations at said sensing station, and cutting said vertically suspended carcass at each said cutting station in accordance with sensed cut indicator designations.

4. The method of claim 3 which includes marking cut guidelines on said carcass to provide said cut indicator designations, scanning said cut guidelines at said sensing station, coverting said sensed cut guidelines to cut control signals, and storing said cut control signals for use at subsequent cutting stations.

5. The method of claim 4 which includes marking said carcass to designate shoulder cuts, loin belly cuts and ham cuts, suspending the carcass from the hind feet thereof and first making the shoulder cuts at a first station, secondly making the loin belly cuts at a second cutting station and thirdly making the ham cuts at a third cutting station.

6. The method of claim 5 which includes releasing the suspended hind feet of said carcass subsequent to said ham cutting station.

7. The method of claim 5 which includes video scanning said cut guidelines at said scanning station and storing the cut control signals resulting from said shoulder cut guidelines for use at said first cutting station, storing the cut control signals resulting from the loin belly cut guidelines for use at said second cutting station and storing the cut control signals resulting from said ham cut guidelines for use at said third cutting station.

8. The method of claim 7 which includes employing said stored control signals to position cutters at said cutting stations to cut said carcass along said cut guidelines.

9. The method of claim 7 which includes scanning said carcass in a video camera scan frame, dividing said scan frame vertically into two equal sections encompassing the left and right sides of said carcass respectively and dividing said scan frame horizontally into three sections with a lower section encompassing said shoulder cut guidelines, an intermediate section encompassing said loin belly cut guidelines and an upper section encompassing said ham cut guidelines.

10. The method of claim 9 which includes dividing said scan frame horizontally at a point within the top 11% of said frame to form said upper section and at a point below the top 11% of said frame but within the top 36% of said frame to form said intermediate and lower sections.

11. The method of claim 10 which includes providing control signals resulting from scanned cut guidelines to specific cutting stations in accordance with the frame section in which said cut guidelines were scanned.

12. An apparatus for automatically cutting a vertically suspended animal carcass moving along an overhead conveyor along cut designations previously applied to said carcass to define at least an upper and lower section comprising conveying means for suspending said carcass from an upper end thereof and moving said carcass along a defined path, sensing means positioned adjacent said path for sensing said cut designations and providing control signals indicative of the position thereof on said carcass, adjustable cutting means positioned after said sensing means along said defined path and adjacent thereto for severing a section of said carcass from the remaining suspended portion thereof, and position control means to receive said control signals from said sensing means and operating in response to said control signals to cause said cutting means to cut said carcass along said cut designations.

13. The apparatus of claim 12 wherein said cutting means operates to make transverse cuts in said vertically suspended carcass to cause severed sections thereof to drop away from the remainder of the suspended carcass by gravity.

14. The apparatus of claim 13 which includes receiving means positioned beneath said cutting means and beneath said defined path to receive severed sections of said carcass.

15. The apparatus of claim 13 wherein said position control means is operative in response to said control signals to vary both the vertical position of said cutting means and the inclination of said cutting means relative to said carcass.

16. The apparatus of claim 13 wherein said cutting means is adapted to sever a plurality of vertical sections from said suspended carcass sequentially from the bottom thereof along a plurality of vertically spaced cut designations previously applied to said carcass, said cutting means including a plurality of cutting stations spaced along said defined path, each said cutting station including adjustable cutter means adapted to sever a section from said suspended carcass along one of said cut designations.

17. The apparatus of claim 16 wherein said sensing means includes video scanning means for scanning said carcass in a video scan frame and providing control signals indicative of the position of each of said cut designations and storage means for storing said control signals, said storage means operating to provide control signals indicative of the position of a respective cut designation to said position control means upon movement of said carcass into position adjacent a cutting station adapted to sever said carcass along said respective cut designation, said position control means operating to control the position of the adjustable cutter means for each said cutting station in response to control signals from said storage means.

18. The apparatus of claim 17 wherein each said cutting station includes means for providing an output signal indicative of the position of the adjustable cutter means for said cutting station, said positioning means including comparator means for comparing said output signal with the control signal from said storage means to provide an error signal indicative of the difference between said output and control signals, and cutter driving means for receiving said error signal and driving said adjustable cutter means to zero said error signal.

19. The apparatus of claim 16 wherein said conveying means includes means to suspend said carcass by the hind feet thereof, and release means to release said hind feet after said carcass has passed by each of said cutting stations.

20. An apparatus for automatically making shoulder cuts, loin cuts and ham cuts in a vertically suspended animal carcass along vertically spaced cut designations previously applied to said carcass comprising overhead conveying means for vertically suspending said carcass by the hind feet thereof and moving said suspended carcass along a defined path, sensing means positioned adjacent said path for sensing said cut designations and providing control signals indicative of the position thereof on said carcass, said sensing means including scanning means for horizontally scanning across the extent of said carcass from the bottom to the top end thereof to provide control signals indicative of the position of each of said cut designations and storage means for receiving and storing said control signals, said control signals for the respective shoulder cut designations, loin cut designations and ham cut designations being stored separately by said storage means, a shoulder cut station positioned along said defined path subsequent to said sensing means, said shoulder cut station including adjustable shoulder cutter means adapted to sever the shoulder cuts from said suspended carcass along said shoulder cut designations to cause the severed shoulder cuts to drop away from the remainder of the suspended carcass by gravity, first position control means to provide first position signals indicative of the actual vertical position of said shoulder cutter means relative to said carcass, shoulder cut station detector means operative to provide a first detector signal when said carcass moves into position at said shoulder cut station for a shoulder cut, said first detector signal being directed by said shoulder cut station detector means to said storage means, the storage means operating upon receipt of said first detector signal to output the control signals for the shoulder cut designations, first comparator means for receiving and comparing said first position signals and the control signals for the shoulder cut designations to provide a first error signal indicative of any difference therebetween, said first position control means including first drive means responsive to said first error signal to vertically position said adjustable shoulder cutter means until said first error signal is zeroed and to subsequently cause said shoulder cutter means to sever the shoulder cuts along the shoulder cut designations on said carcass, a loin cut station positioned along said defined path subsequent to said shoulder cut station, said loin cut station including adjustable loin cutter means adapted to sever the loin cuts from said suspended carcass along said loin cut designations to cause the severed loin cuts to drop away from the remainder of the suspended carcass by gravity, second position control means to provide second position signals indicative of the actual vertical position of said loin cutter means relative to said carcass, loin cut station detector means operative to provide a second detector signal when said carcass moves into position at said loin cut station for a loin cut, said second detector signal being directed by said loin cut station detector means to said storage means, the storage means operating upon receipt of said second detector signal to output the control signals for the loin cut designations, second comparator means for receiving and comparing said second position signals and the control signals for the loin cut designations to provide a second error signal indicative of any difference therebetween, said second position control means including second drive means responsive to said error signal to vary both the vertical position and the inclination of said loin cutter means to cause said loin cutter means to sever the loin cuts along said loin cut designations on said carcass, a ham cut station positioned along said defined path subsequent to said loin cut station, said ham cut station including adjustable ham cutter means adapted to sever the ham cuts from said suspended carcass along said ham cut designations to cause the severed ham cuts to drop away from the remainder of the suspended carcass by gravity, third position control means to provide third position signals indicative of the actual vertical position of said ham cutter means relative to said carcass, ham cut station detector means operative to provide a third detector signal when said carcass moves into position at said ham cut station for a ham cut, said third detector signal being directed by said ham cut station detector means to said storage means, the storage means operating upon receipt of said third detector signal to output the control signals for the ham cut designations, third comparator means for receiving and comparing said third position signals and the control signals for the ham cut designations to provide a third error signal indicative of any difference therebetween, said third position control means including third drive means responsive to said third error signal to vertically position said adjustable ham cutter means until said third error signal is zeroed and to subsequently cause said ham cutter means to sever the ham cuts along said ham cut designations on said carcass, and release means positioned along said designated path subsequent to said ham cut station, said release means operating after the carcass has passed said ham cut station to release the hind feet from said overhead conveyor means.

* * * * *